United States Patent
Knop

(10) Patent No.: US 11,236,950 B2
(45) Date of Patent: Feb. 1, 2022

(54) METHOD FOR OPERATING A REGENERATIVE HEAT STORAGE ARRANGEMENT AND HEAT STORAGE ARRANGEMENT

(71) Applicant: Carbon-Clean Technologies GmbH, Cologne (DE)

(72) Inventor: Klaus Knop, Sulzburg (DE)

(73) Assignee: Carbon-Clean Technologies GmbH, Cologne (DE)

( * ) Notice: Subject to any disclaimer, the term of this patent is extended or adjusted under 35 U.S.C. 154(b) by 0 days.

(21) Appl. No.: 17/047,167

(22) PCT Filed: Apr. 16, 2019

(86) PCT No.: PCT/EP2019/059804
§ 371 (c)(1),
(2) Date: Oct. 13, 2020

(87) PCT Pub. No.: WO2019/201918
PCT Pub. Date: Oct. 24, 2019

(65) Prior Publication Data
US 2021/0123689 A1    Apr. 29, 2021

(30) Foreign Application Priority Data
Apr. 18, 2018   (DE) .......................... 102018003162.5

(51) Int. Cl.
*F28D 21/00*    (2006.01)
*F28D 20/00*    (2006.01)

(52) U.S. Cl.
CPC ............. *F28D 21/00* (2013.01); *F28D 20/00* (2013.01); *F28D 2021/0019* (2013.01)

(58) Field of Classification Search
CPC .. F28D 21/00; F28D 20/00; F28D 2021/0019; F28D 17/04; F28D 17/005
(Continued)

(56) References Cited

U.S. PATENT DOCUMENTS 9,518,786 B2 * 12/2016 Howes ...................... F02C 6/16
10,288,357 B2 * 5/2019 Laughlin ................... F01K 3/12
(Continued)

FOREIGN PATENT DOCUMENTS

DE    102014017346 A1    4/2016
EP         2574865 A1    4/2013

OTHER PUBLICATIONS

International Search Report in corresponding International Application No. PCT/EP2019/059804, dated Sep. 3, 2019.

*Primary Examiner* — Jon T. Schermerhorn, Jr.
(74) *Attorney, Agent, or Firm* — Andrus Intellectual Property Law, LLP

(57) ABSTRACT

A method for operating a regenerative heat storage arrangement, wherein the heat storage arrangement has a gas heater for heating a carrier gas; a heat storage row with multiple heat storage modules; and at least one compressor. During a loading cycle, carrier gas heated in the gas heater flows through at least one heat reservoir module, which is thermally charged by the transfer of heat from the heated carrier gas to a heat storage material of the heat reservoir module. The carrier gas is cooled during the charging process. If, after the charging of a heat reservoir module, the carrier gas temperature reaches or exceeds a minimum charging temperature for a subsequent heat reservoir module, the carrier gas is fed to the subsequent heat reservoir module for charging. The carrier gas is recirculated back to the gas heater if the carrier gas temperature falls below the minimum charging temperature.

9 Claims, 14 Drawing Sheets

(58) Field of Classification Search
USPC .......................................................... 165/10
See application file for complete search history.

(56) References Cited

U.S. PATENT DOCUMENTS

| | | | |
|---|---|---|---|
| 10,907,510 B2* | 2/2021 | Larochelle | F01K 13/02 |
| 10,907,513 B2* | 2/2021 | Laughlin | F01D 1/02 |
| 2012/0312496 A1 | 12/2012 | Howes et al. | |
| 2013/0033044 A1* | 2/2013 | Wright | F02C 1/10 |
| | | | 290/1 R |
| 2016/0333747 A1* | 11/2016 | KanFman | F17C 9/04 |

* cited by examiner

METHOD FOR OPERATING A REGENERATIVE HEAT STORAGE ARRANGEMENT AND HEAT STORAGE ARRANGEMENT

CROSS-REFERENCE TO RELATED APPLICATIONS

This application is the U.S. national stage application of International Application PCT/EP2019/059804, filed Apr. 16, 2019, which International Application was published on Oct. 24, 2019, as International Publication WO 2019/201918 in the German language. The International Application claims priority to German Application No. 10 2018 003 162.5, filed Apr. 18, 2018. The International Application and German Application are incorporated herein by reference, in their entireties.

FIELD

The invention relates to a method for operating a regenerative heat storage arrangement, the heat storage arrangement comprising at least one gas heater for heating a carrier gas, in particular for heating air, a heat storage row with a plurality of heat storage modules and at least one compressor, wherein during a loading cycle at least one heat storage module, preferably a plurality of subsequent heat storage modules of the heat storage row, is traversed by carrier gas heated in the gas heater and is thermally loaded by heat transfer from the heated carrier gas to a heat storage material of the heat storage module and the carrier gas is cooled during loading, wherein the cooled carrier gas, when the carrier gas temperature after loading a heat storage module reaches or exceeds a minimum loading temperature of a subsequent heat storage module in the heat storage row, is fed to the subsequent heat storage module for loading, and wherein a circulation of the carrier gas is provided if the carrier gas temperature falls below the minimum loading temperature of the subsequent heat storage module, and the carrier gas is fed to the compressor during the circulation and after compression is returned to the gas heater for renewed heating of the carrier gas.

Furthermore, the invention also relates to a regenerative heat storage arrangement, in particular designed and/or arranged to be operated according to a method of the type described above, with at least one gas heater for heating a carrier gas, in particular air, with at least one heat storage row with a plurality of heat storage modules and with at least one compressor, wherein at least one heat storage module, preferably a plurality of subsequent heat storage modules of the heat storage row, during a loading cycle, carrier gas heated in the gas heater can flow through it and be thermally loaded by heat transfer from the heated carrier gas to a heat storage material of the heat storage module, wherein during the loading cycle a recirculation of the carrier gas is provided and carrier gas cooled during loading can be fed to the compressor after flowing through the at least one heat storage module, preferably after flowing through a plurality of subsequent heat storage modules of the heat storage series, and can be returned to the gas heater via the compressor.

Finally, the present invention relates to a method for balancing load peaks in the generation of electrical energy and/or in particular for the decentralized generation of electrical energy by utilizing the heat of heated carrier gas for the generation of electricity in a thermoelectric storage power plant and/or for utilizing the heat of heated carrier gas for the generation of process steam and/or for the generation of district heating and/or for coupling heat into a preheating process, wherein the storage power plant has a regenerative heat storage arrangement and the heat storage arrangement is operated as described above. The method for balancing load peaks and/or for decentralized generation of electrical energy and/or for utilizing the heat of heated carrier gas provides the following steps in this context:

Heating of carrier gas, especially hot air, in at least one gas heater, thermal loading of at least one heat storage module of a plurality of heat storage modules of the storage power plant by heat release from the carrier gas heated in the gas heater to a heat storage material of the heat storage module, delayed thermal discharge of at least one heat storage module, preferably a plurality of the heat storage modules, wherein colder carrier gas, in particular cold air, flows through at least one heat storage module and heat is transferred from the heat storage material to the colder carrier gas for heating the carrier gas, and utilization of the carrier gas heated during the discharge of the at least one heat storage module for the generation of electricity and/or for the generation of process steam and/or for district heating and/or for the coupling of heat.

The expansion of renewable energies leads to a change in the generation structure in the electricity market. Supply-dependent electrical energy from renewable energy sources, such as wind power, biomass and photovoltaics, will account for a large part of the electricity supply in the future. However, the available technologies for power generation from renewable energy sources only allow a limited prediction of the exact amount of electricity generated, which is why fluctuations occur on different time scales, namely from seasonal fluctuations over the course of the day to short-term fluctuations. These fluctuations amplify the fluctuations that occur in the demand for electricity and increase the need to compensate for load peaks. The balancing of peak loads is currently generally carried out via different electricity markets, in which trading is carried out by operators of different generation and storage technologies. In addition, the energy system is facing a transition from centralized to decentralized generation of electrical energy from fossil and renewable energy sources. This results in new demands on the network infrastructure, as the task of network stabilization is increasingly shifting from the transmission network level to the distribution network level. In these, however, there is little or no infrastructure for active control of the networks.

BACKGROUND

From DE 10 2014 017 346 A1 a generic procedure for operating a regenerative heat storage system is known. The known process provides for the use of heat from heated carrier gas, in particular hot air, for the generation of electricity in a thermoelectric storage power plant, whereby a carrier gas, such as air, is first heated to a specific loading target temperature in at least one gas heater of the storage power plant. The carrier gas is used for thermal loading of a plurality of heat storage modules of the thermal storage power plant, whereby heat is transferred from the hot carrier gas to a heat storage material of the heat storage module (loading cycle). In order to generate hot gas in sufficient quantity and/or with a sufficiently high loading target temperature for loading the heat storage modules, several gas heaters can be used. A maximum target loading temperature when heating the carrier gas in the gas heater can be 1000° C. to 1300° C., preferably 1100° C. to 1200° C.

In the case of the time-delayed thermal final discharge of at least one heat storage module of the heat storage series, the stored usable heat or the usable heat content of the heat storage module is used in the generic method for heating the cold carrier gas, in particular cold air. For this purpose, cold carrier gas flows through at least one heat storage module and heat is transferred from the heat storage material to the carrier gas (discharge cycle). The carrier gas is heated to a certain discharge temperature when flowing through the heat storage module. The target discharge temperature required for heat transfer can be 500° C. to 900° C., preferably 600° C. to 800° C. The heat of the hot carrier gas generated during a discharge cycle can then be transferred to a working fluid, for example, which can be used in a steam power process to generate electricity.

If the carrier gas is heated in the gas heater by converting electrical energy into thermal energy, whereby the gas heater may have at least one electrical heating resistor for this purpose, the process according to the invention and the storage power plant according to the invention can contribute to load management in the power grid, whereby electrical energy is stored in the form of heat during a loading cycle at times of high power generation and low power demand. At peak load times, at least one heat storage module is then discharged in a discharge cycle and the hot carrier gas thus produced is used to generate electricity, for example to evaporate water for a steam power process. The generated electrical energy can be fed back into the power grid. An operator of the storage power plant in accordance with the invention can offer system services and participate in the control energy market. The heat storage modules used enable simple and inexpensive storage of electrical energy in the form of heat, whereby electrical power can be made available flexibly and in a very short time as well as inexpensively during short-term high consumption peaks.

Furthermore, the disclosure content of DE 10 2014 017 346 A1 is fully included in the disclosure content of the present description of the invention. This concerns in particular the constructive and plant-related design of the heat storage arrangement described in DE 10 2014 017 346 A1 and the described heat storage power plant.

If the heat storage modules are designed in a row and form a heat storage row, whereby the carrier gas heated to a loading target temperature in the gas heater flows through the heat storage modules of the heat storage row during a loading cycle and the heat storage modules are heated, the carrier gas leaves the first heat storage module of the heat storage row initially cold at the beginning of the loading cycle. As the heat absorption of the storage mass of this heat storage module increases, the temperature of the carrier gas flowing out of the heat storage module rises.

If the temperature of the carrier gas at the outlet of a heat storage module reaches or exceeds a specified minimum loading temperature, the carrier gas is fed to a subsequent heat storage module in the heat storage row and used to load this heat storage module. This process is repeated for all heat storage modules in the heat storage row which are subsequently loaded. The carrier gas is then discharged from the last loaded heat storage module of the heat storage row, cooled down to the temperature level of the minimum loading temperature, for example.

If the carrier gas cools below the minimum loading temperature during loading of a heat storage module, the operating procedure known from DE 10 2014 017 346 A1 provides for a recirculation of the carrier gas during the loading cycle. The cooled carrier gas is fed to a compressor or blower where it is compressed and, after compression, returned to the gas heater. There the carrier gas is heated again and then used for further loading of the heat storage series.

The maximum temperature at which the carrier gas can be fed to the compressor during recirculation is coupled to the material- and volume-related limitation of the inlet temperature into the compressor and is usually below 250° C., in particular at approx. 200° C. In addition, higher carrier gas temperatures lead to an increase in the power consumption of the compressor.

The maximum temperature at which the carrier gas is fed to the compressor during recirculation is only slightly below the minimum loading temperature at which the carrier gas is still used to load a heat storage module. As a result, the permissible level of the minimum loading temperature is also coupled to the permissible level of the compressor inlet temperature.

Simulation calculations by the notifying party have confirmed that maximum utilization of the heat storage modules (depending on the number of heat storage modules) of between 40% and 60% can be achieved with the known method of operating a regenerative heat storage system. This refers to a cyclic operation of the storage arrangement (loading/unloading). According to the invention, "utilization of the storage tank arrangement" is understood to mean the energy content of the storage tank actively available for the generation of hot air during storage tank discharge, based on a theoretically maximum possible energy content at, for example, 1,200° C. The low utilization with the known method of operating a regenerative heat storage system increases the costs of energy storage, since a large part of the storage material is not used for the active storage of thermal energy.

SUMMARY

The object of the present invention is to provide a method for operating a regenerative heat storage arrangement, a heat storage arrangement and a method for balancing load peaks and/or for the in particular decentralized generation of electrical energy and/or for utilizing the heat of heated carrier gas, in each case of the type mentioned above, which are characterized by an improved mode of operation of the heat storage arrangement, wherein in particular a higher utilization of the heat storage arrangement in cyclic operation at low mechanical-thermal load of the system components of the heat storage arrangement should be possible.

The above-mentioned object is solved by a method for operating a regenerative heat storage arrangement with the features of claim 1, by a heat storage arrangement with the features of claim 8 and by a method for balancing load peaks in the generation of electrical energy and/or for the in particular decentralized generation of electrical energy and/or for utilizing heat from heated carrier gas with the features of claim 9. Advantageous embodiments of the invention are subject matter of the sub claims.

The method of operation of a regenerative heat storage system according to the invention provides for the determination or specification of a minimum carrier gas loading temperature for the loading of the heat storage modules, which is above a permissible target temperature at the compressor inlet. If the carrier gas has at least the minimum loading temperature after loading a heat storage module and leaving the heat storage module, the carrier gas is used as in the process known from DE 10 2014 017 346 A1 for loading a subsequent heat storage module of the heat storage series. If the carrier gas temperature falls below the minimum loading temperature, the carrier gas is, however, circulated via the compressor to the gas heater and, after being heated again, is used to charge (another) at least one heat storage module of the heat storage series. A measuring, control and/or regulating device is provided for carrying out the operating procedure in accordance with the invention. In this case, the temperature of the carrier gas is measured during a loading cycle after its exit from a heat storage module and compared with the specified minimum loading temperature (set point). Depending on the carrier gas temperature, the volume flow of the carrier gas and the flow control is then controlled and/or regulated by means of suitable control and/or regulating valves.

Since the inlet temperature into the compressor is limited to a permissible setpoint temperature due to the material and volume, the invention provides for cooling of the carrier gas to be recycled during circulation during a loading cycle if the carrier gas temperature of the recycled carrier gas is above the permissible setpoint temperature at the compressor inlet.

The inventive operating method is associated with a number of advantages. On the one hand, the higher minimum loading temperature leads to a higher maximum utilization of the described storage arrangement. Simulation calculations carried out in connection with the invention have proven that the maximum utilization of the heat storage arrangement can reach up to 85% with, for example, five heat storage modules and a discharge temperature of 760° C. Further heat storage modules can increase the utilization to over 90%. Increasing the utilization of the storage arrangement leads to a reduction of the heat storage costs, because according to the invention a larger part of the storage material can be used for the active storage of thermal energy. Cooling the carrier gas to be recycled before it enters the compressor allows the use of less expensive machines and ensures low compressor power consumption.

The carrier gas temperature at the outlet of the last heat storage module of the heat storage row can preferably correspond to the minimum loading temperature. This can be set by appropriate control and/or regulation of the carrier gas volume flows which are fed to the last heat storage module for loading.

In the discharge cycle, at least one thermally loaded heat storage module of the heat storage row, preferably a plurality of subsequent heat storage modules of the heat storage row, is traversed by colder carrier gas, in particular cold air, and is thermally discharged by heat transfer to the colder carrier gas, the colder carrier gas being heated during the thermal discharge of the heat storage module and then being available for further use, in particular for the generation of electrical energy and/or for heat utilization.

According to the invention, the minimum loading temperature can be more than 250° C., preferably more than 350° C., further preferably between 350° C. and 600° C., especially preferably approx. 400° C. to 500° C. The temperature difference between the minimum charge temperature and the setpoint temperature at the compressor inlet can preferably be more than 100° C., further preferably more than 150° C. This also allows higher temperatures to be reached when the storage tank arrangement is discharged, thus achieving high utilization rates.

In the heat storage arrangement according to the invention, at least one heat transfer device arranged between the heat storage row and the compressor is provided in the flow path of the carrier gas for cooling the carrier gas during the circulation. Preferably, the carrier gas is cooled during the recirculation process by heat transfer to compressed carrier gas returned to the gas heater, so that the compressed carrier gas is preheated before entering the gas heater. Indirect heat transfer by means of a recuperator may be provided, whereby heat transfer between the carrier gas to be recycled may also be provided via a cooling loop before the compressor inlet and after the compressor outlet. A thermal oil can be used as coolant. In addition, heat transfer can also be carried out with a regenerator, preferably a rotary heat exchanger, such as a Ljungström regenerator, which allows short changeover times. The direct heat exchange and the heat exchange via a regenerator allow higher minimum loading temperatures, which in turn leads to higher utilization rates as well as higher temperatures when discharging the storage system.

When using recuperators and/or regenerators, minimum loading temperatures of more than 400° C. can be specified. Heat exchange via a cooling circuit using thermal oil as coolant, on the other hand, can enable minimum loading temperatures of less than 400° C.

Multi-stage cooling of the carrier gas to be recycled can also be provided before it enters the compressor. In this context, the carrier gas can only be cooled to a temperature above the setpoint temperature at the compressor inlet by heat transfer to compressed carrier gas returned to the gas heater, for example to a temperature above 60° C., preferably from 80° C. to 100° C. At least one further heat transfer device can then be provided in the flow path of the cooled carrier gas after a first heat transfer device of the type described above upstream of the compressor, the carrier gas being cooled in the further heat transfer device to the set temperature at the compressor inlet after heat transfer to compressed carrier gas returned to the gas heater. Thus, a predetermined set temperature at the compressor inlet can be safely maintained. The further heat transfer device can, for example, be a recuperator, whereby heat from the carrier gas is transferred to a coolant, especially water, in the case of indirect heat transfer.

The target temperature at the compressor inlet can be less than 70° C., preferably less than 60° C., more preferably 50° C. or less.

In addition, a further preferred embodiment of the invention provides that carrier gas to be recycled is combined with hot carrier gas from the gas heater during the loading cycle in the recirculation system before entering the compressor in order to control the temperature of the carrier gas. In particular, the temperature of the carrier gas fed to the compressor during the recirculation cycle can be kept essentially constant, which simplifies the control of the compressor. In addition, carrier gas is fed to the gas heater at a substantially constant temperature level, which is also an advantage.

Further features, advantages and possible applications of the present invention result from the following description of design examples based on the drawing and the drawing itself. All described and/or pictorially represented features alone or in any combination form the subject-matter of the present invention, irrespective of their summary in the claims or their retro-relation.

DETAILED DESCRIPTION

Figure 1:
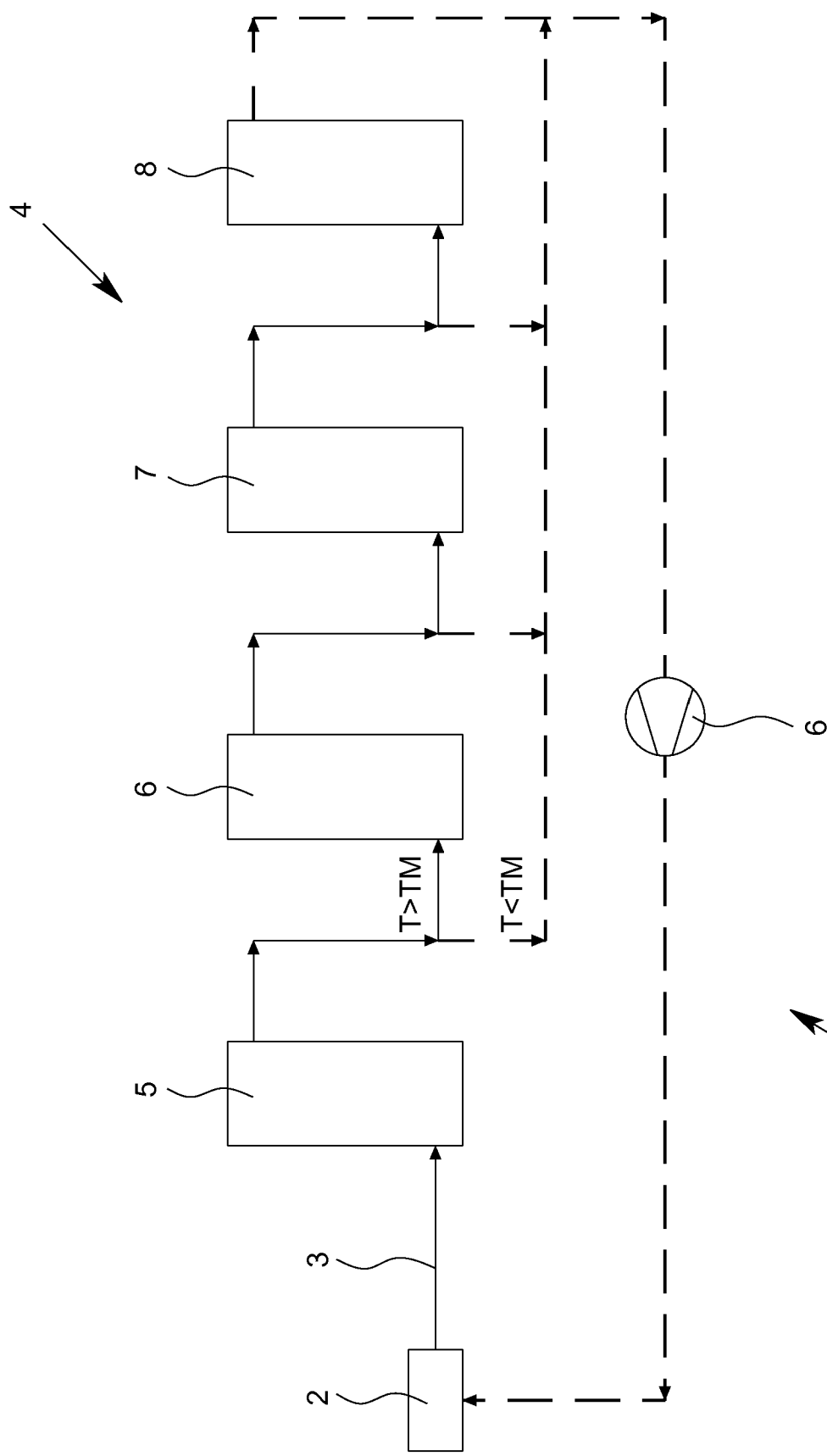
FIG. 1 is a schematic process flow chart of a known process for operating a regenerative heat storage arrangement.

FIG. 1 shows a known heat storage arrangement 1 with at least one gas heater 2 for heating a carrier gas 3, in particular air, and with a heat storage row 4, the heat storage row 4 having, as examples, four further heat storage modules 5 to 8 connected in series. It goes without saying that more or less than four heat storage modules 5 to 8 can also form a heat storage row 4.

A blower or compressor 6 is also provided.

The heat storage arrangement 1 can correspond to the heat storage arrangement described in the disclosure document DE 10 2014 017 346 A1 and be operated according to the procedure described in the aforementioned disclosure document. The disclosure content of DE 10 2014 017 346 A1 is fully included in the disclosure content of this description both with regard to the type and design of the heat storage arrangement 1 and with regard to the known operating procedure.

During a loading cycle or during the loading process of the heat storage modules 5 to 8, highly heated air of more than 1,000° C., in particular of 1,200° C., first enters the first heat storage module 5 of the heat storage series 4 as carrier gas 3 from an electrically heated gas heater 2, for example, into the first heat storage module 5 of the heat storage series 4. As it flows through the heat storage module 5, heat from the carrier gas 3 is transferred to the storage material. The carrier gas 3 can initially leave the first heat storage module 5 cold.

With increasing filling of the first heat storage module 5, the temperature of the carrier gas 3 at the outlet of the heat storage module 5 rises, i.e. the air leaving the heat storage module 5 changes temperature as the first heat storage module 5 is increasingly loaded. If the carrier gas temperature T exceeds a specified minimum loading temperature TM of the subsequent heat storage module 6 in the heat storage row 4 after loading the first heat storage module 5, or at least reaches the minimum loading temperature TM, the carrier gas 3 is fed to the subsequent heat storage module 6 for loading. If, on the other hand, the carrier gas temperature T is below the minimum loading temperature TM, a recirculation of the carrier gas 3 is provided, whereby the carrier gas 3 is fed to the compressor 6 and, after compression, is returned to the gas heater 2 for renewed heating of the carrier gas 3 and subsequent use for (further) loading of the heat storage modules 5 to 8.

In the known process, the minimum loading temperature is determined by the material- and volume-related limitation of the target temperature at the inlet of compressor 6 and can be between 200° C. and 250° C., for example.

The previously described loading of the subsequent heat storage modules 6 to 8 corresponds to the described loading procedure of the heat storage module 5. The temperature T of the carrier gas 3 at the outlet of the last heat storage module 8 can correspond to the minimum loading temperature TM.

Figure 2:
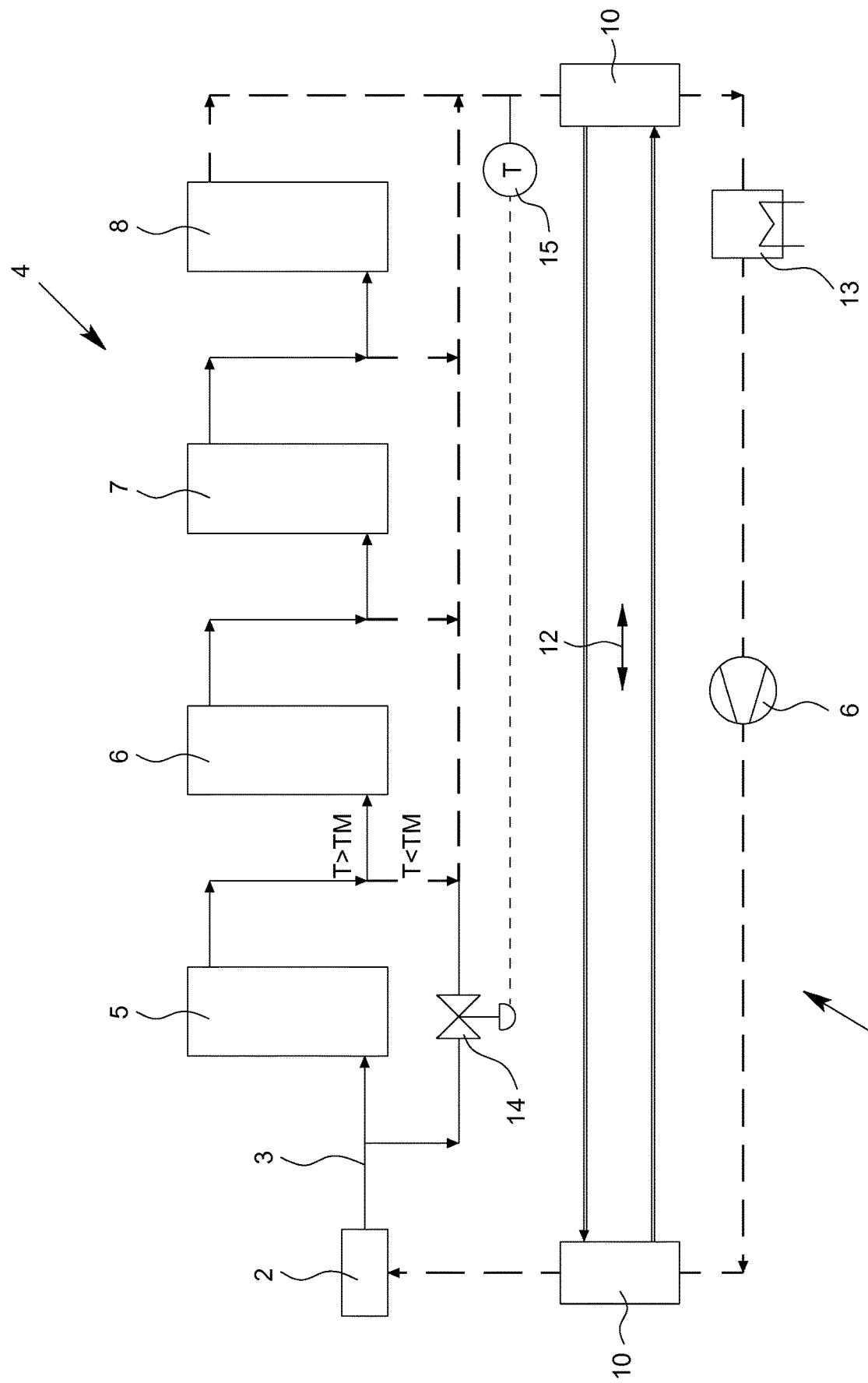
FIG. 2 is a schematic process flow chart of a process according to the invention for operating a regenerative heat storage arrangement.

FIG. 2 shows a new method of operating a regenerative heat storage arrangement 9, whereby identical reference symbols identify units, apparatuses or assemblies of identical construction and/or function of the heat storage arrangements 1, 9 shown in FIGS. 1 and 2.

Deviating from the known heat storage arrangement 1 shown in FIG. 1, the heat storage arrangement 9 from FIG. 2 has a schematically shown heat transfer device 10 in the flow path of the carrier gas 3 between the heat storage row 4 and the compressor 6. This makes it possible to cool the carrier gas 3 to be recycled before it enters the compressor 6 and thus to provide a higher minimum loading temperature TM when loading the further heat storage modules 6, 7, 8 following the first heat storage module 5 in the heat storage row 4 with, for example, 400° C. or more, whereby the minimum loading temperature is above a permissible target temperature at the compressor inlet. The compressor inlet temperature can be only 50° C. to 60° C., for example.

Also in the heat storage arrangement 9 shown in FIG. 2 a circulation of the carrier gas 3 is provided during a loading cycle if the carrier gas temperature T falls below the minimum loading temperature TM of the following heat storage module 6, 7, 8, whereby the carrier gas 3 is fed to the compressor 6 during the circulation and after compression is returned to the gas heater 2 for renewed heating of the carrier gas 3. In order to satisfy the material- and/or volume-related limitation of the inlet temperature into compressor 6 and to achieve low compressor inlet temperatures, the carrier gas 3 is cooled in the heat transfer device 10 during the recirculation process before entering the compressor 6, if the carrier gas temperature T is above a certain setpoint temperature at the compressor inlet. By increasing the minimum loading temperature TM in comparison to the known operating method described in FIG. 1, a higher utilization of the heat storage arrangement 9 can be achieved, i.e. a higher ratio of the actually available energy content of the storage unit in relation to the theoretically possible energy content or a maximum possible energy content at a certain temperature of the heated carrier gas 3 at the exit from the gas heater 2. The utilization of the heat storage arrangement 9 can thus be more than 80%, preferably more than 85%, in particular more than 90%, with the new operating method.

Figure 3:
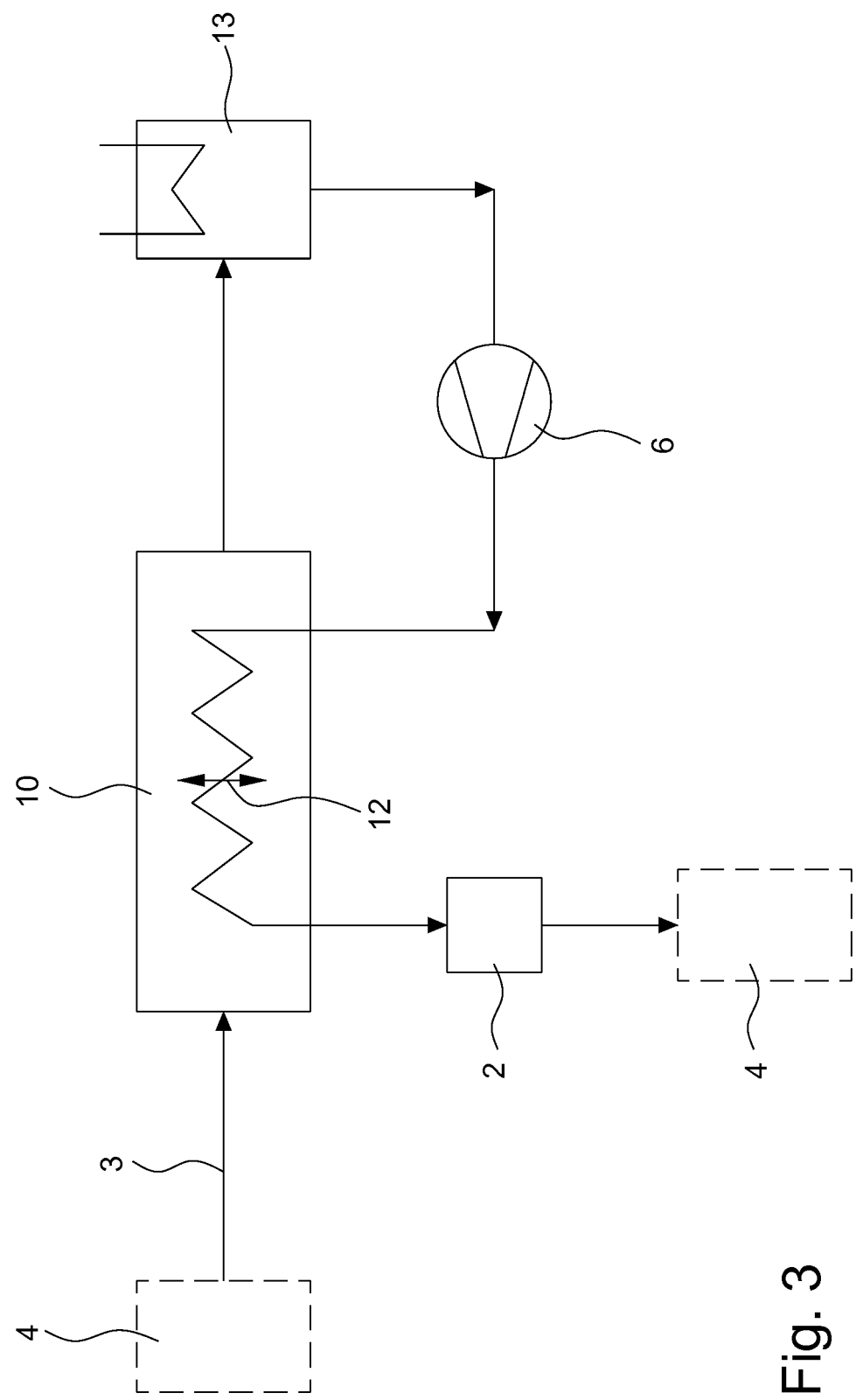
FIG. 3 is a schematic process flow chart of a heat transfer device for cooling a circulating carrier gas in the process according to a first embodiment of the invention.
Figure 4:
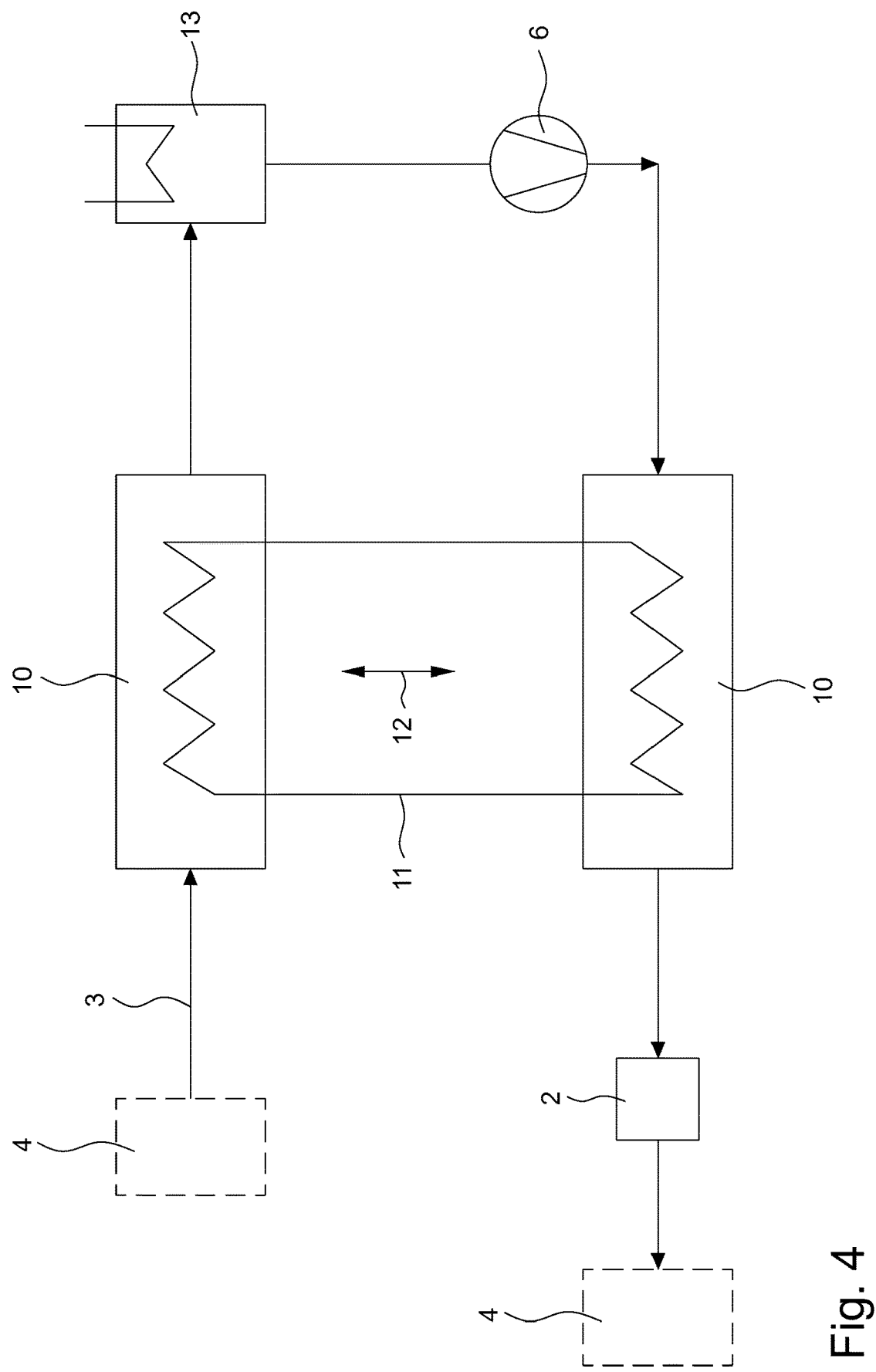
FIG. 4 is a schematic process flow chart of a heat transfer device for cooling a circulating carrier gas in the process according to a second embodiment of the invention.
Figure 5:
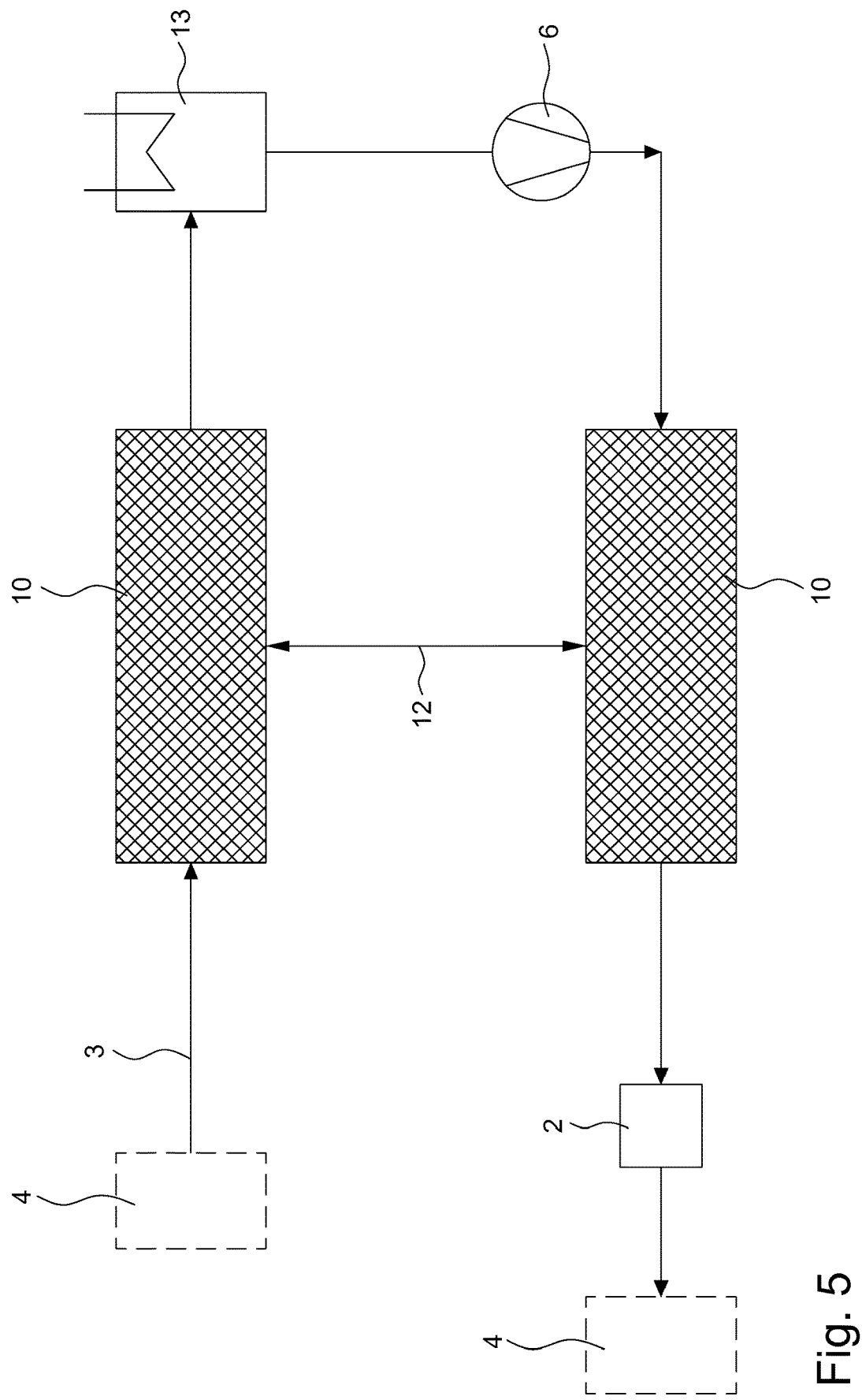
FIG. 5 is a schematic process flow chart of a heat transfer device for cooling a circulating carrier gas in the process according to a third embodiment of the invention.

As can also be seen from FIG. 2, the carrier gas 3 is cooled in the heat transfer device 10 by heat transfer to compressed carrier gas 3 which is returned to the gas heater 2. The heat transfer between warmer carrier gas 3 from the heat storage series 4 (before it is fed to the compressor 6) and colder carrier gas 3 (after it leaves the compressor 6) can be performed indirectly by means of recuperator(s), whereby the carrier gas flows are spatially separated by a heat-permeable wall (FIG. 3) or a coolant loop 11 is provided (FIG. 4), whereby a thermal oil can be used as coolant. According to FIG. 5, the heat transfer can also be semi-indirect, whereby the two carrier gas flows are brought into contact with a heat accumulator with a time delay. Heat exchangers of this class are regenerators. The heat flow transferred in the heat transfer device 10 is shown schematically in FIGS. 2 to 5 by arrow 12.

In order to cool down the carrier gas 3 even more and to ensure that the carrier gas 3 before entering the compressor 6 does not exceed the set temperature at the compressor inlet, at least one cooler 13 may be provided in the flow path of the carrier gas 3 before the compressor 6.

As further shown in FIG. 2, hot carrier gas 3 from the gas heater 2 and carrier gas 3 to be recycled from a heat storage module 5 to 8, whose carrier gas temperature is below the minimum loading temperature for loading a subsequent heat storage module 6, 7, 8, are combined via a control valve 14. The carrier gas volume flows are matched to each other in such a way that a constant temperature is achieved at the mixing point, e.g. in the range of the minimum loading temperature, further, for example, approx. 400° C. to 500° C. Before the carrier gas 3 enters the heat transfer device 10, a temperature measuring device 15 can be provided to measure the temperature of the carrier gas 3 and to control the carrier gas temperature at the mixing point by means of the control valve 14. As a result, a carrier gas 3 is fed to the heat transfer device 10 at a constant temperature level above the setpoint temperature at the compressor inlet and can be cooled, for example, in counter current with a colder carrier gas 3 from compressor 6. The compressed carrier gas 3 preheated in this way can then be coupled back into the heat storage row via the gas heater 2 and used for (further) loading.

By keeping the carrier gas temperature constant, the process engineering requirements on compressor 6 and the control effort are reduced. In addition, a constant carrier gas temperature 3 upstream of the gas heater 2 has a positive effect on the operating mode and costs of the gas heater 2.

Figure 6:
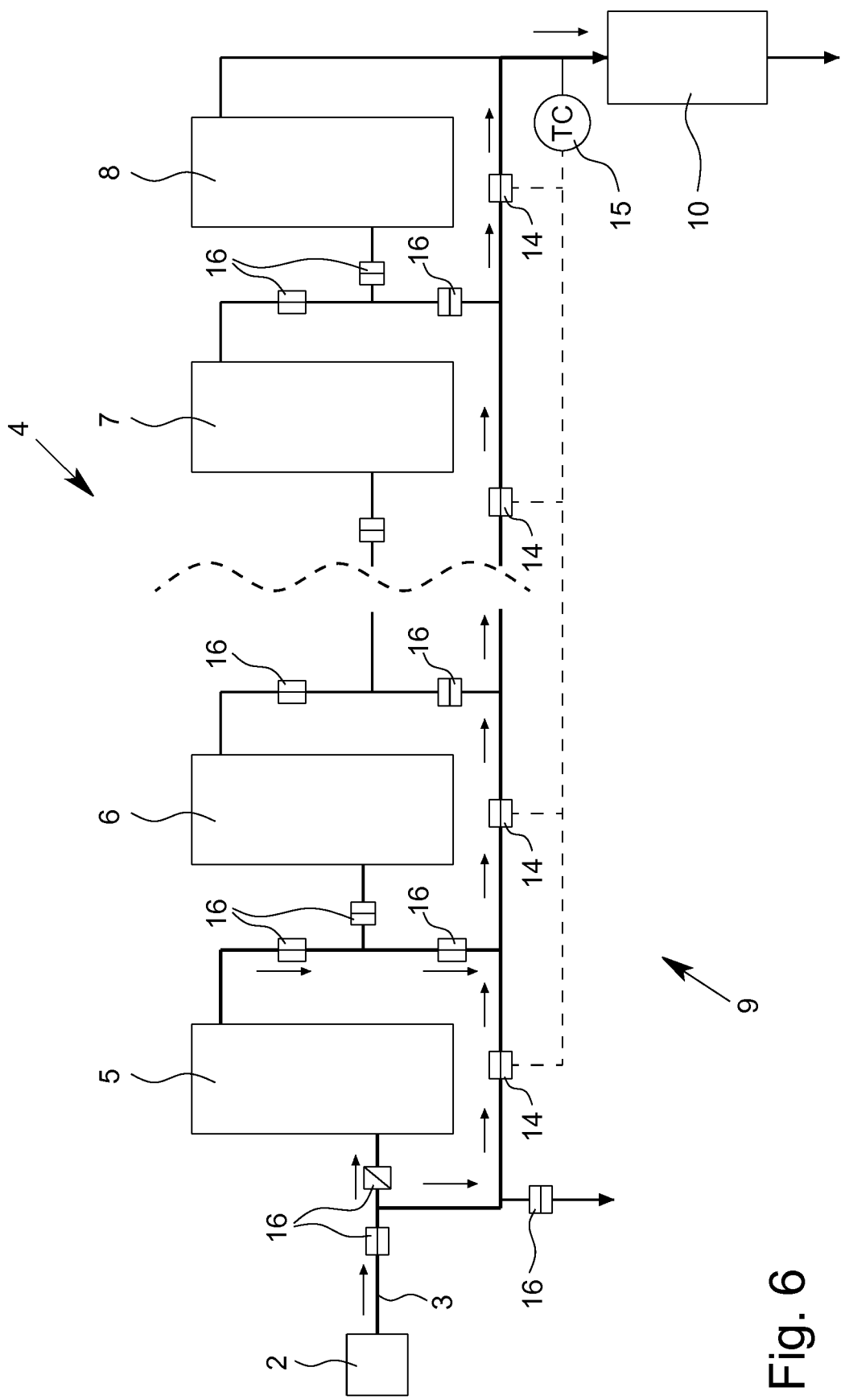
FIG. 6 is a schematic partial process flow diagram of the process shown in FIG. 2 for operating a regenerative heat storage arrangement during the loading of a first heat storage module of a storage row of the heat storage arrangement.
Figure 7:
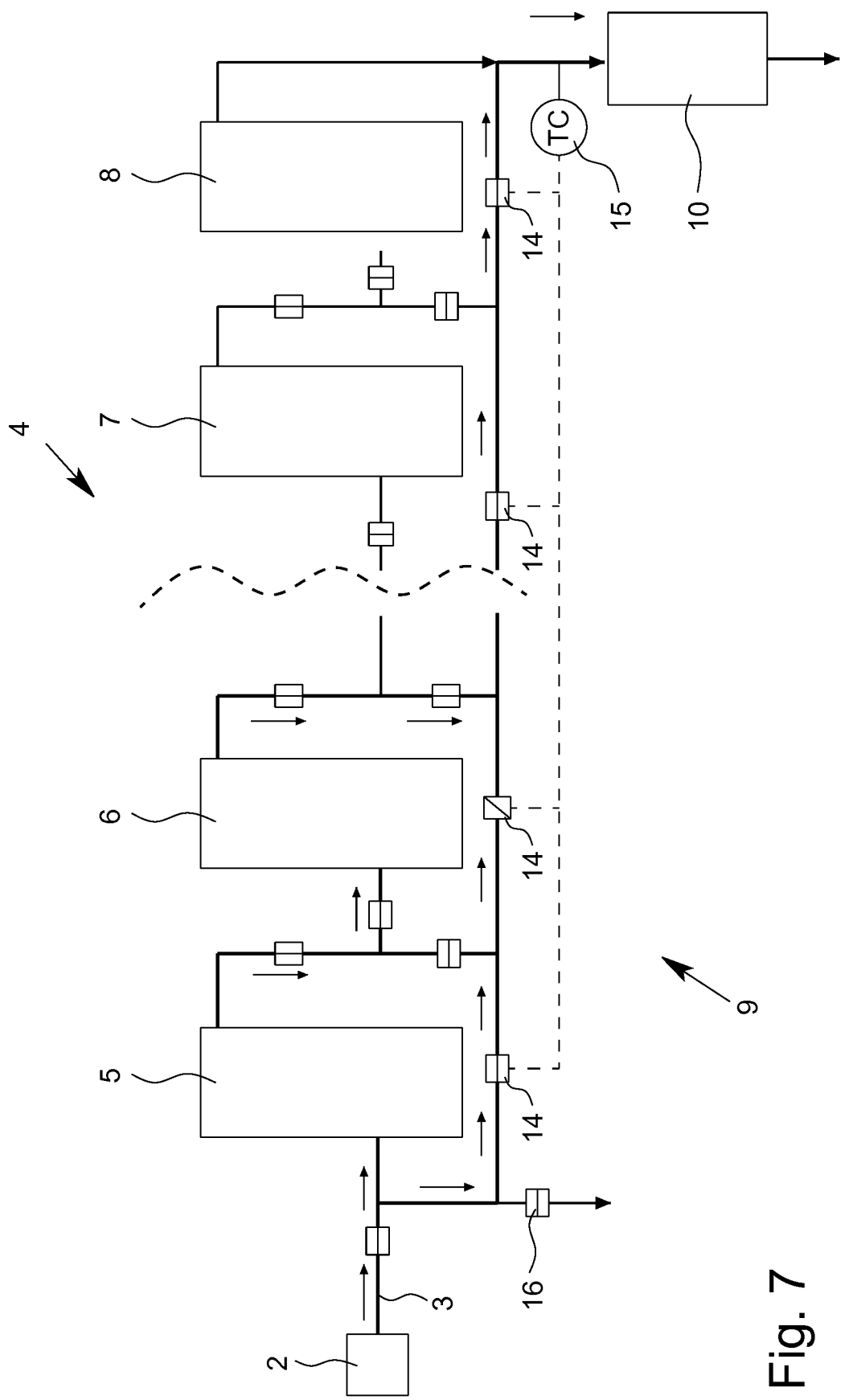
FIG. 7 is a schematic partial process flow diagram of the method shown in FIG. 2 for operating a regenerative heat storage arrangement during the loading of the first heat storage module and a subsequent second heat storage module of the storage row of the heat storage arrangement.
Figure 8:
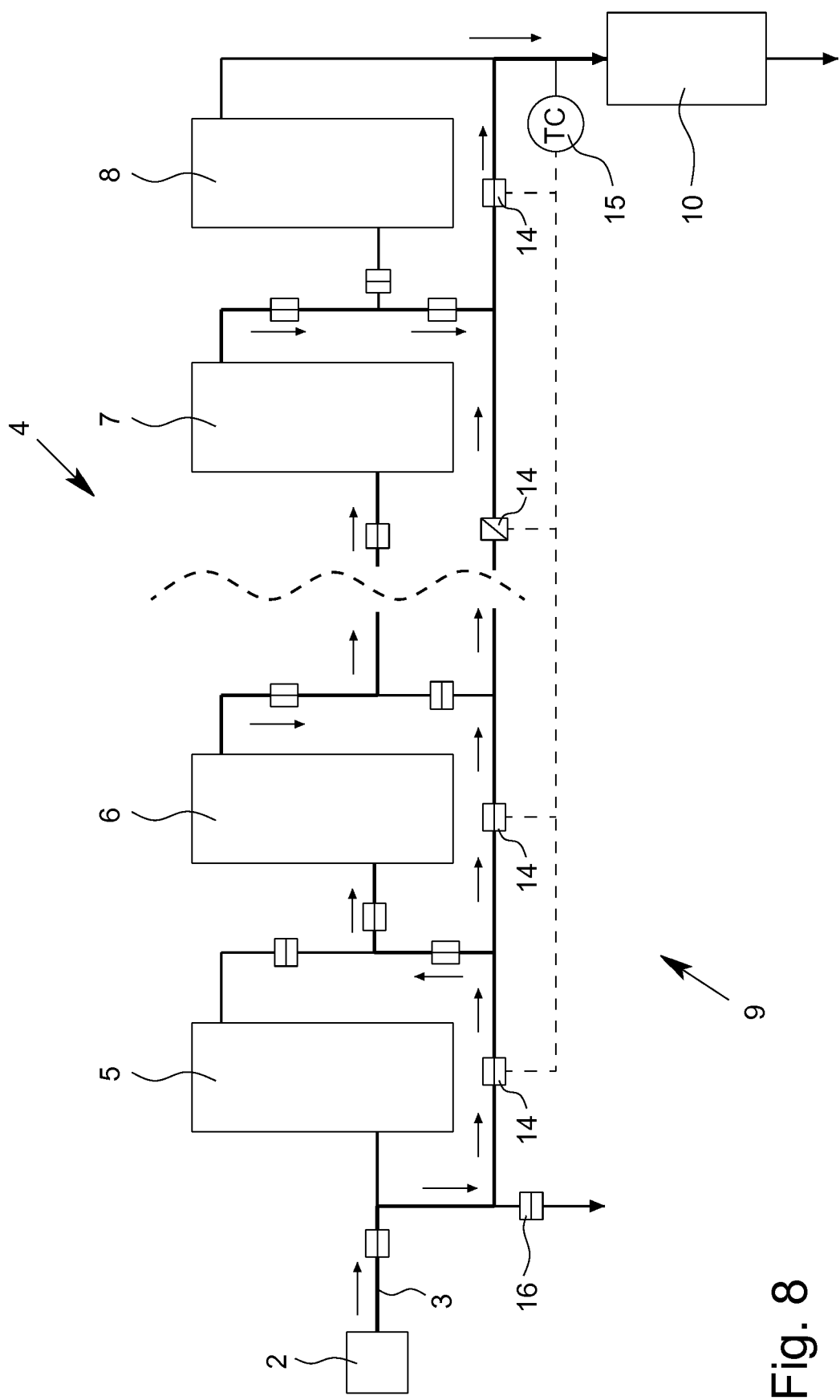
FIG. 8 is a schematic partial process flow diagram of the method shown in FIG. 2 for operating a regenerative heat storage arrangement during the loading of the second heat storage module and a third heat storage module of the storage row of the heat storage arrangement following in the heat storage row.

FIGS. 6 to 10 schematically show the loading of the heat storage row 4 of the heat storage arrangement 9 shown in FIG. 2, where FIG. 6 represents the loading of the first heat storage module 5 of the heat storage row 4, FIG. 7 the loading of the first two heat storage modules 5, 6 and FIG. 8 the loading of the second heat storage module 6 and the third heat storage module 7. At the loading status shown in FIG. 8, the first heat storage module 5 is already fully loaded and can then have a storage temperature between 600 and 1,000° C., preferably 800° C. FIG. 8 shows a bypass of the carrier gas 3 past the first heat storage module 5 when the first heat storage module 5 is already fully loaded. The heat storage module 5 is then deactivated. In principle, it is also possible that no bypass guide is provided and that hot carrier gas 3 still flows through a heat storage module 5-7 even if it is already fully loaded. This allows the storage temperature of the loaded heat storage module 5-7 to be kept at a specified target temperature.

Figure 9:
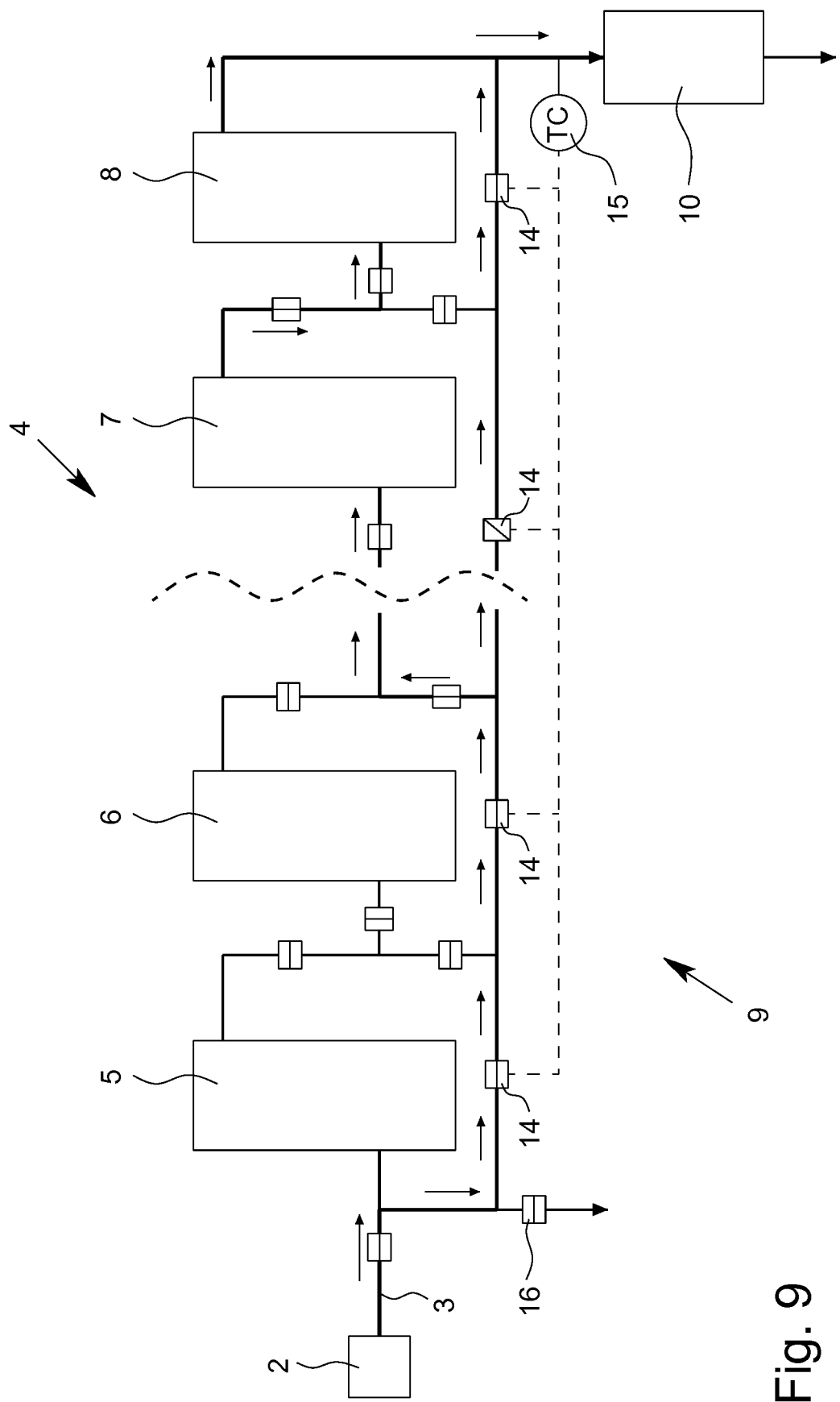
FIG. 9 is a schematic partial process flow diagram of the method shown in FIG. 2 for operating a regenerative heat storage arrangement during the loading of a third heat storage module and a fourth heat storage module of the storage row of the heat storage arrangement following in the heat storage row.

FIG. 9 shows the loading process for the third heat storage module 7 and the fourth heat storage module 8, whereby the first two heat storage modules 5, 6 are already fully loaded. Here, too, a bypass guide is not necessarily required to route the carrier gas 3 past the two fully loaded heat storage modules 5, 6. The carrier gas flows are guided by means of suitable valves, which are preferably controllable, especially depending on a measured carrier gas temperature before entering the heat transfer device 10.

Figure 10:
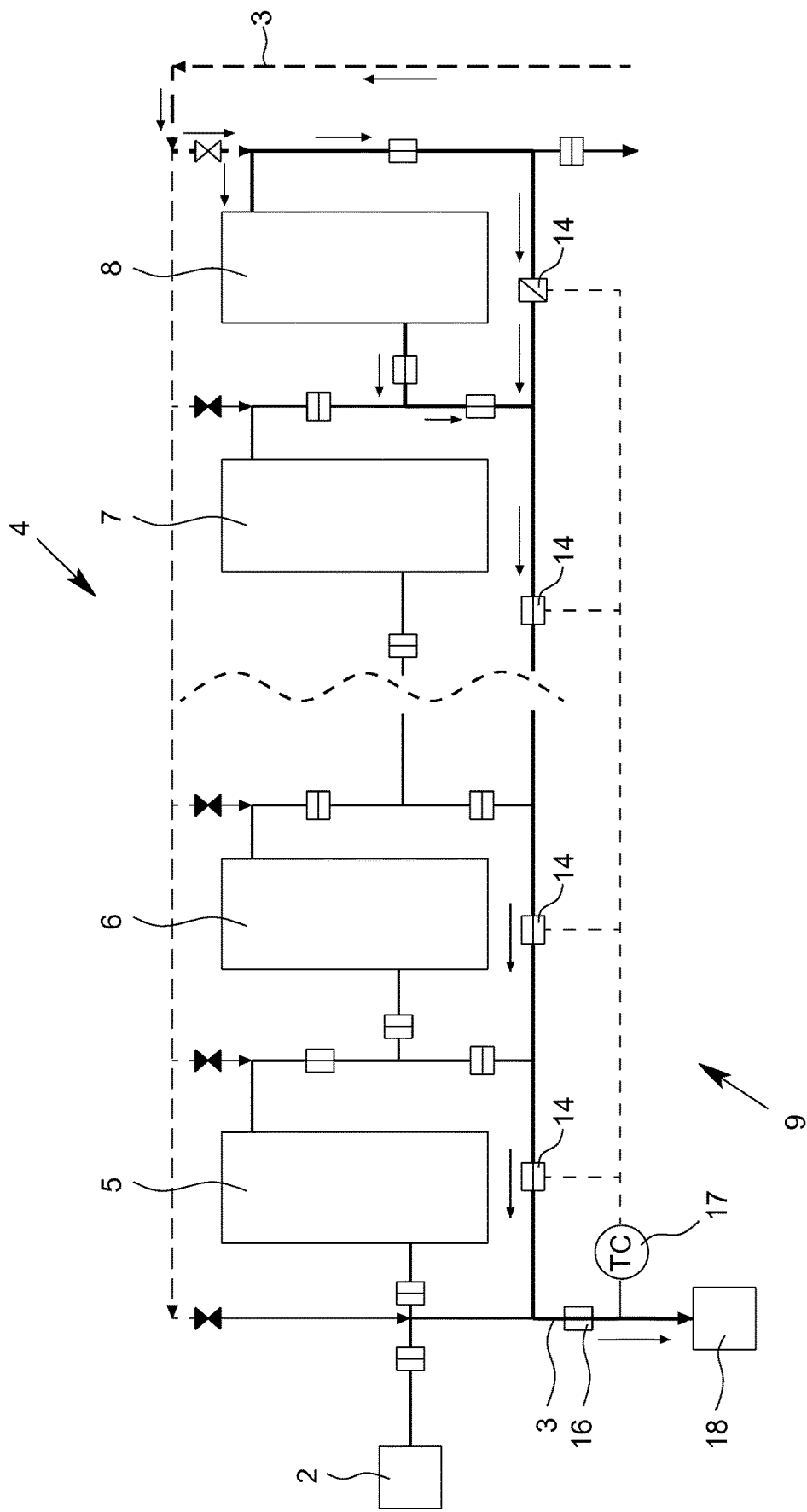
FIG. 10 is a schematic partial process flow chart of the invention-related process shown in FIG. 2 for the final loading of the last heat storage module of the heat storage row.
Figure 11:
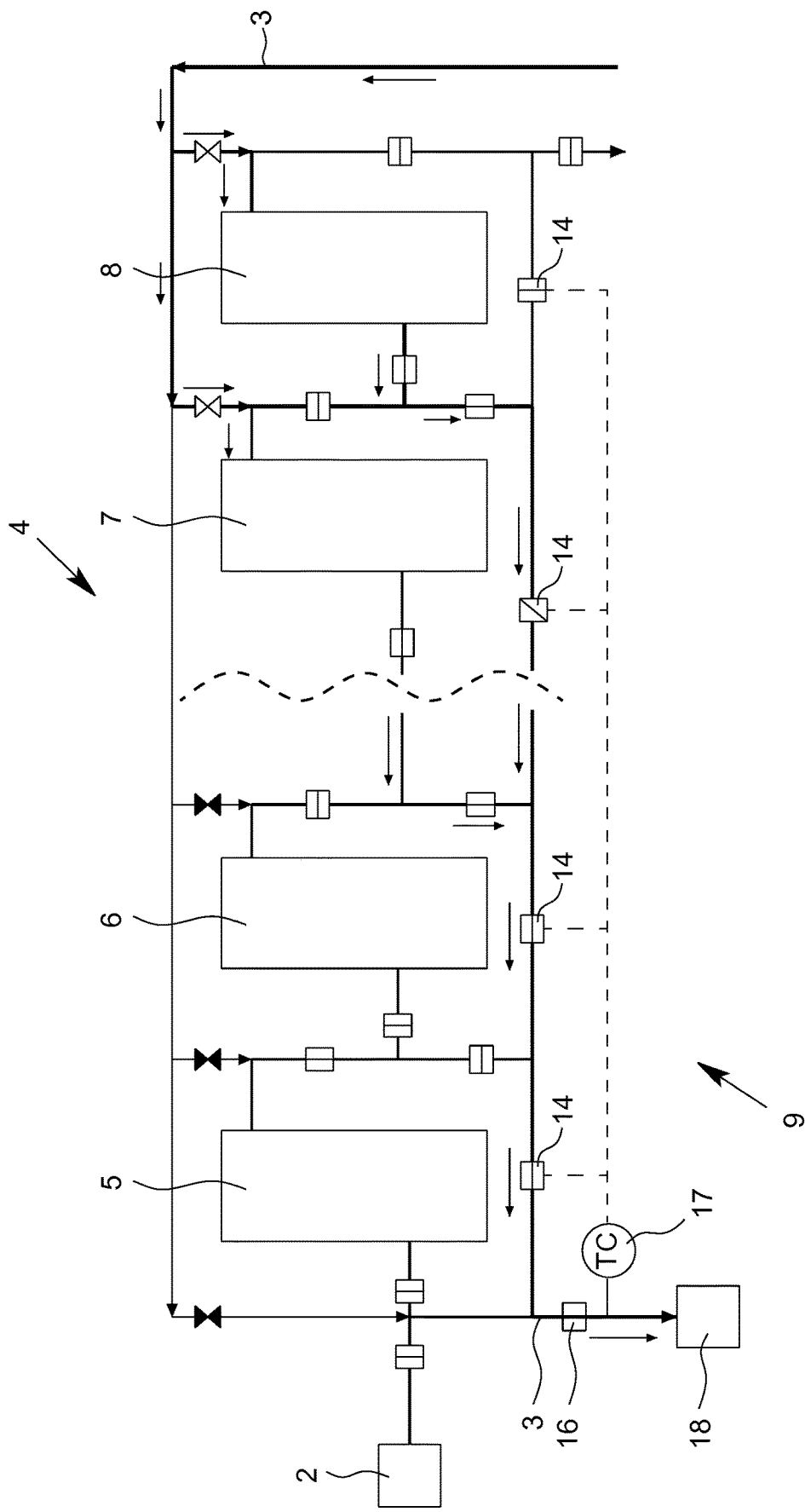
FIG. 11 is a schematic partial process flow chart of the invention-related process shown in FIG. 2 for the final loading of the last two heat storage modules of the heat storage row and FIGS. 12-14 are temperature profiles that show an increase in the utilization of the heat storage row by increasing the minimum loading temperature of the heat storage modules and cooling the carrier gas after it leaves the heat storage row and before the compressor.

FIGS. 10 and 11 show an example and schematic diagram of the discharge of heat storage row 4, where FIG. 10 shows the discharge of the last heat storage module 8 of the heat storage row and FIG. 11 the discharge of the last two heat storage modules 7, 8. During the discharging process, a colder carrier gas 3 flows through the heat storage row 4, starting with the last heat storage module 8, and heated carrier gas 3 is fed to a consumer 18 shown in the diagram. A further temperature measuring device 17 is provided to measure the temperature of the hot carrier gas 3, which is fed to consumer 18. The control and/or regulation of the temperature of the hot carrier gas 3 can be carried out via control valves 16, which determine the volume flows of the carrier gas 3 from the individual heat storage modules 7, 8. The discharge process can basically be carried out as described in DE 10 2014 017 346 A1.

The use of the carrier gas 3 heated during the discharge can be provided in a steam power process, in particular in combination with a gas expansion process, to generate electricity and/or the hot carrier gas 3 obtained during a discharge process can be used for process steam and/or district heat generation and/or for coupling heat into a preheating process.

As shown in FIGS. 6 to 9, carrier gas 3 is mixed with hot carrier gas 3 from the gas heater 2 if the carrier gas 3 falls below a specified minimum loading temperature for a subsequent heat storage module 6, 7, 8 and for loading the subsequent heat storage module 6 (FIG. 6), 7 (FIG. 7), 8 (FIG. 8) and instead is fed in the circuit via the heat transfer devices 10, 13 to compressor 6, where it is compressed and then returned to the gas heater 2. According to FIG. 9, the carrier gas 3 exits the last heat storage module 8 of the heat storage row 4 with a carrier gas temperature that preferably corresponds to the minimum loading temperature or can be higher or lower than it. The heat transfer devices 10, 13 ensure in any case that the carrier gas 3 is present at the compressor inlet after cooling to the set temperature. If, on the other hand, the carrier gas temperature at the outlet of the last heat storage module 8 of the heat storage row 4 is at a temperature level below the minimum loading temperature, a constant higher carrier gas temperature can be set before the entry into the heat transfer device 10, in particular the minimum loading temperature, by supplying hot carrier gas 3 from the gas heater 2. This applies accordingly to the other heat storage modules 5, 6, 7.

The same applies to the mixing of the carrier gas 3 from one of the upstream heat storage modules 5, 6, 7 if the carrier gas temperature is below the minimum loading temperature of the respective downstream heat storage module 6, 7, 8 of heat storage row 4 and a circulation of the carrier gas 3 is required for reheating. By mixing with hot carrier gas 3 from the gas heater 2, the carrier gas 3 emerging from a heat exchanger module 5 to 8 can be heated and a predetermined, especially constant carrier gas temperature can be set before entering the heat transfer device 10.

Figure 12:
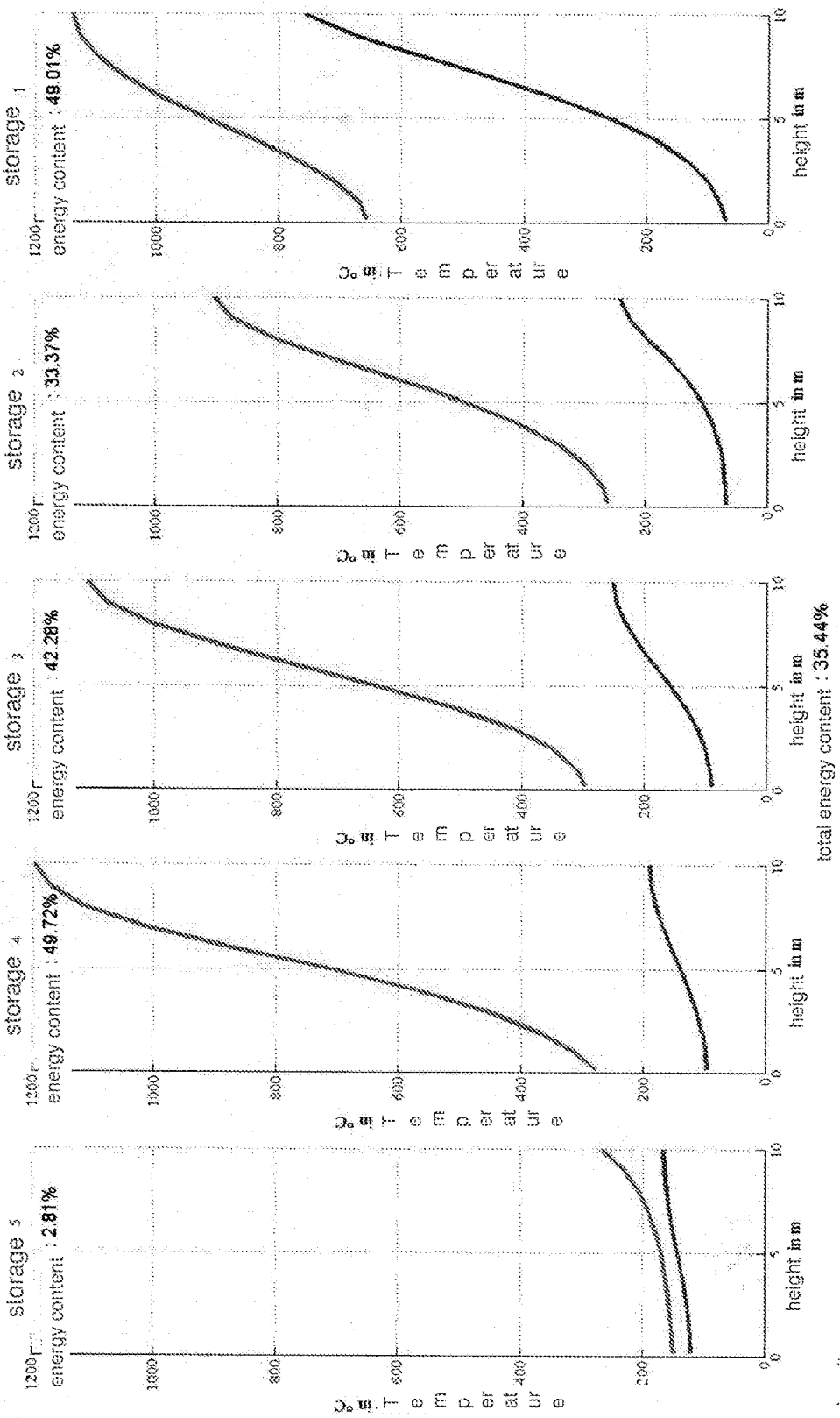
Figure 13:
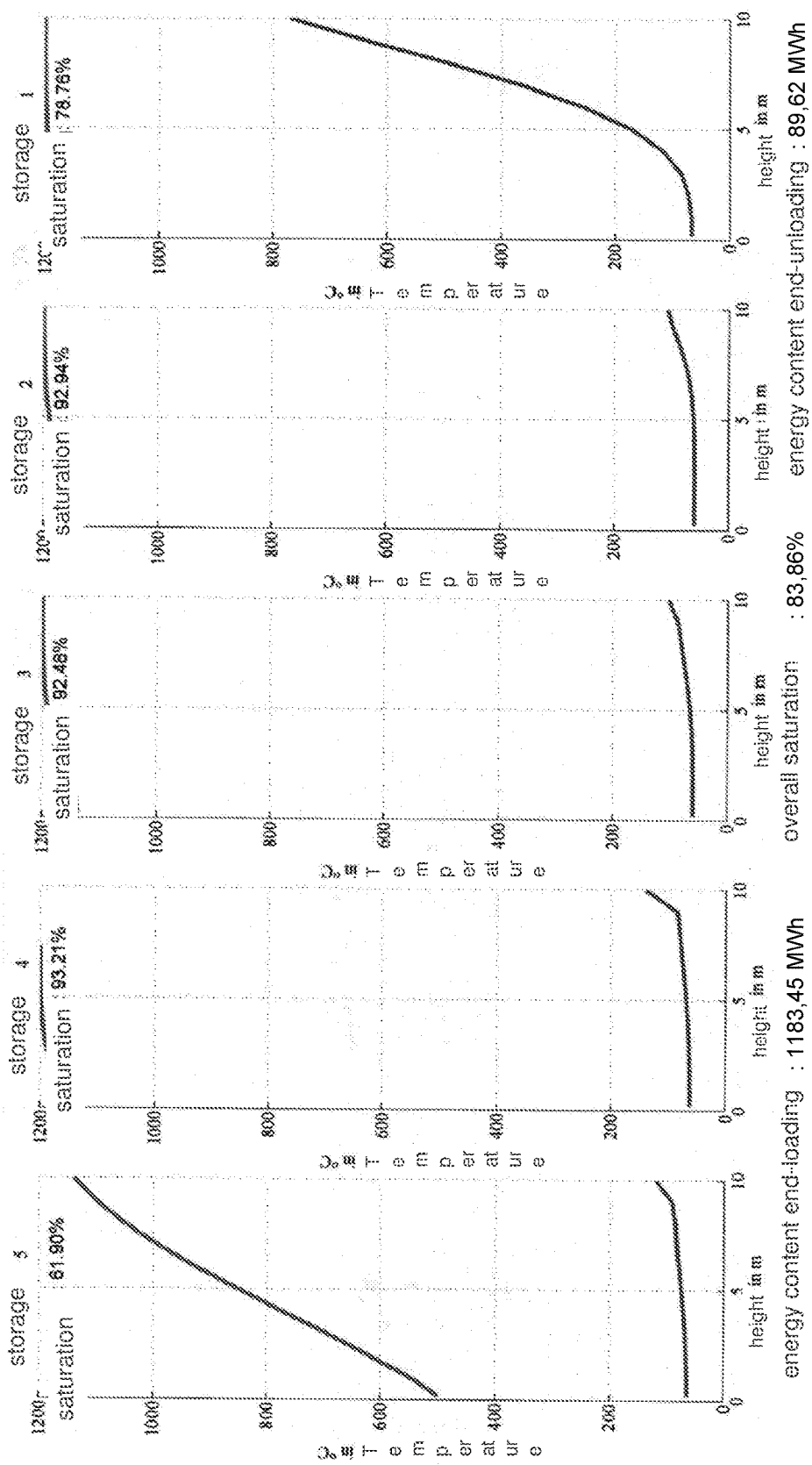
Figure 14:
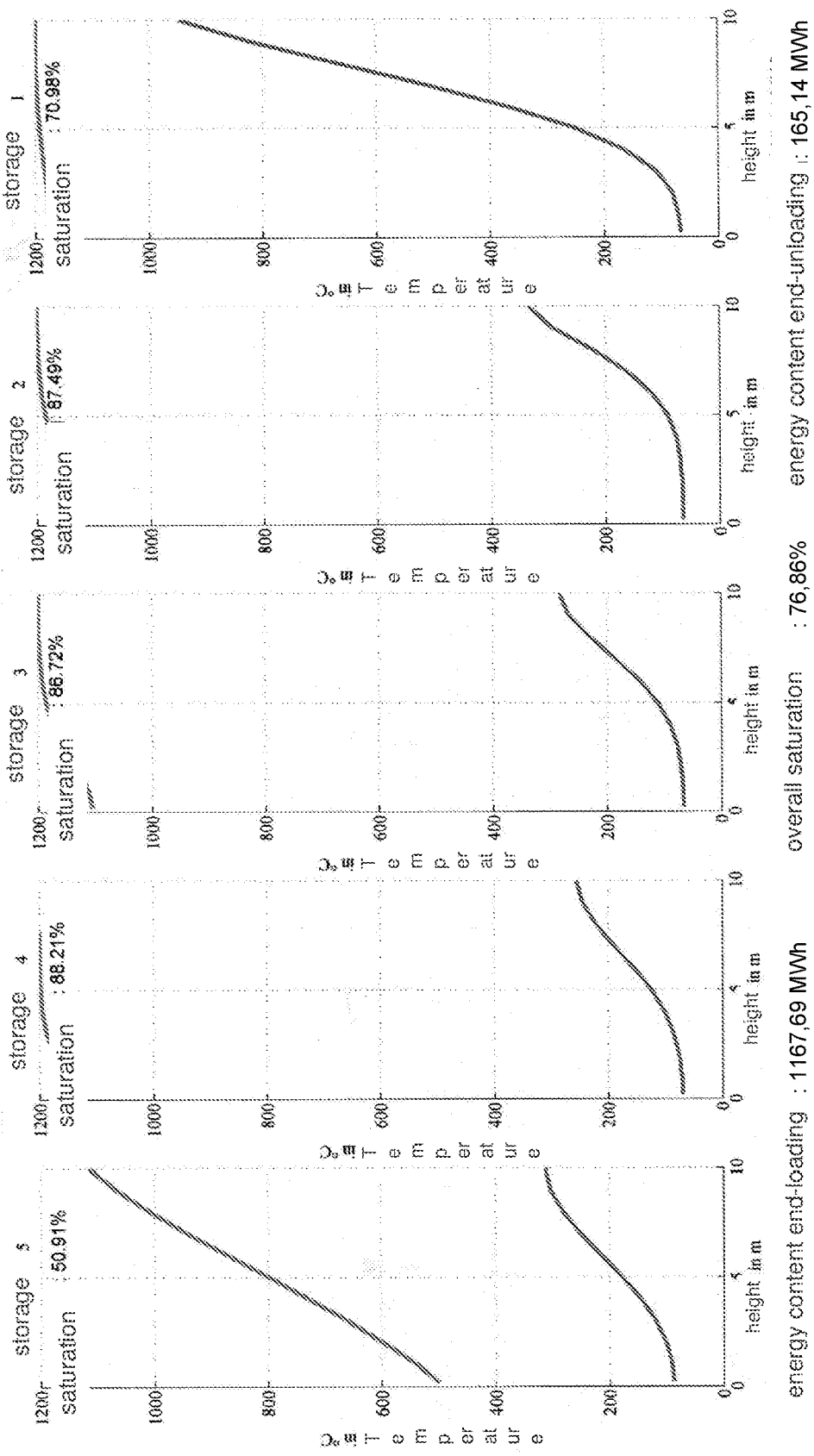

FIGS. 12 to 14 show on the basis of simulation results that by cooling the carrier gas 3 as described above during the recirculation process after it leaves the heat storage row 4 and before it enters the compressor 6 in the heat transfer device 10, in particular by heat transfer to compressed carrier gas 3 returned to the gas heater 2, the energy utilization of the heat storage series can be considerably increased, which is associated with a corresponding reduction in the required storage masses.

FIG. 12 shows the temperature profile of a heat storage arrangement with five heat accumulators, where the carrier gas is not cooled before entering the compressor. The maximum temperature difference of the carrier gas relative to the end of the load or the exit from the heat storage row and the entry into the compressor is 150° C. A utilization of 35% can be determined. The carrier gas reaches a temperature of 760° C. when the heat storage tank row is finally charged for consumption purposes.

FIG. 13 shows the temperature profile of a heat storage arrangement with five heat accumulators, where the carrier gas is cooled in a heat transfer device before entering the compressor by heat transfer to the compressed carrier gas during the cycle as described above. The carrier gas exits at a temperature of 500° C. when the heat storage array is loaded and is fed to the heat transfer device at this temperature level. The compressor inlet temperature is constant, for example 50° C. A utilization of 84% can be determined. The temperature of the carrier gas during unloading is 760° C.

FIG. 14 shows the temperature profile of a heat storage arrangement with five heat accumulators, where again the carrier gas is cooled in a heat transfer device during the cycle before entering the compressor by heat transfer to compressed carrier gas returned to the gas heater. The exit temperature of the carrier gas from the heat storage series is 500° C. At this temperature level the carrier gas is fed to the heat transfer device. The temperature to the compressor, for example, is a constant 50° C. A utilization of 76% can be determined. The temperature of the carrier gas at discharge can be 950° C., whereby a high temperature level can be maintained over a long period of time to the consumer.

REFERENCE LIST

1 Heat storage arrangement
2 Gas heater
3 Carrier gas
4 Heat storage row
5 Heat storage module
6 Heat storage module
7 Heat storage module
8 Heat storage module
9 Heat storage arrangement
10 Heat transfer device
11 Coolant loop
12 Heat flow
13 Cooler
14 Valve
15 Temperature measuring device
16 Valve
17 Temperature measuring device
18 Consumers

The invention claimed is:

1. A method for operating a regenerative heat storage arrangement, wherein the heat storage arrangement has at least one gas heater for heating a carrier gas, in particular for heating air, a heat storage row with a plurality of heat storage modules and at least one compressor, wherein during a loading cycle at least one heat storage module, preferably a plurality of subsequent heat storage modules of the heat storage row, is traversed by carrier gas heated in the gas heater and is thermally loaded by heat transfer from the heated carrier gas to a heat storage material of the heat storage module and the carrier gas is cooled during loading, wherein the carrier gas, if the carrier gas temperature after loading a heat storage module reaches or exceeds a minimum loading temperature of a subsequent heat storage module in the heat storage row, is fed to the subsequent heat storage module for loading, and wherein a circulation of the carrier gas is provided if the carrier gas temperature falls below the minimum loading temperature of the subsequent heat storage module, and the carrier gas is fed to the compressor during the recirculation and, after compression, is returned to the gas heater for renewed heating of the carrier gas, wherein a minimum loading temperature above a permissible setpoint temperature at the compressor inlet is selected and wherein the carrier gas is cooled during the recirculation before entering the compressor if the carrier gas temperature is above the permissible setpoint temperature at the compressor inlet.

2. The method according to claim 1, wherein the minimum loading temperature is more than 250° C., preferably more than 350° C., more preferably between 350° C. and 700° C., particularly preferably between 400° C. and 600° C.

3. The method according to claim 1, wherein at least one heat transfer device is provided in the flow path of the carrier gas after the exit from the heat storage row and upstream of the compressor in order to cool the carrier gas during the circulation, in particular by heat transfer to compressed carrier gas returned to the gas heater.

4. The method according to claim 3, wherein the carrier gas is cooled to a temperature greater than or equal to 60° C., preferably 80° C. to 100° C., in particular by heat transfer to compressed carrier gas returned to the gas heater.

5. The method according to claim 3, wherein at least one cooler is provided in the flow path of the carrier gas after the heat transfer device and before the compressor in order to cool the carrier gas to the desired temperature at the compressor inlet.

6. The method according to claim 1, wherein the setpoint temperature at the compressor inlet is less than 70° C., preferably less than 60° C., more preferably 50° C. or less.

7. The method according to claim 1, wherein the carrier gas is mixed with hot carrier gas from the gas heater during the circulation after the exit from a heat storage module and before the entry into the compressor in order to control the carrier gas temperature, in particular to keep it constant.

8. A heat storage arrangement, in particular designed and/or arranged to be operated according to the method of claim 1, comprising at least one gas heater for heating a carrier gas, in particular air, at least one heat storage row with a plurality of heat storage modules and at least one compressor, wherein in at least one heat storage module, preferably a plurality of subsequent heat storage modules of the heat storage row, during a loading cycle, carrier gas heated in the gas heater can flow through and can be thermally loaded by heat transfer from the heated carrier gas to a heat storage material of the heat storage module, wherein during the loading cycle a circulation of the carrier gas is provided and carrier gas cooled during loading is provided after flowing through the at least one heat storage module, preferably after flowing through a plurality of subsequent heat storage modules of the heat storage row, can be fed to the compressor and can be returned to the gas heater via the compressor, wherein at least one heat transfer device arranged between the heat storage row and the compressor is provided in the flow path of the carrier gas for cooling the carrier gas during the circulation and before the entry into the compressor.

9. A method for balancing load peaks in the generation of electrical energy and/or for the, in particular, decentralized generation of electrical energy by utilizing the heat of heated carrier gas for the generation of electricity in a thermoelectric storage power plant and/or for utilizing the heat of heated carrier gas for the generation of process steam and/or for the generation of district heating and/or for coupling heat into a preheating process, wherein the storage power plant has a regenerative heat storage arrangement with at least one gas heater, a heat storage row with a plurality of heat storage modules and at least one compressor and the heat storage arrangement is operated according to the method of claim 1, comprising the steps of:

heating of carrier gas, especially hot air, in at least one gas heater, thermal loading of at least one heat storage module of a plurality of heat storage modules of the storage power plant by heat emission from the carrier gas heated in the gas heater to a heat storage material of the heat storage module, delayed thermal discharge of at least one heat storage module, preferably a plurality of heat storage modules, wherein colder carrier gas, in particular cold air, flows through at least one heat storage module and heat is transferred from the heat storage material to the colder carrier gas for heating the carrier gas, and utilization of the carrier gas heated during the discharge of the at least one heat storage module for power generation in a steam power process, in particular in combination with a gas expansion process, and/or for process steam and/or for district heat generation and/or for coupling heat into a preheating process.

* * * * *